United States Patent [19]
Ghiassian

[11] Patent Number: 5,322,084
[45] Date of Patent: Jun. 21, 1994

[54] FOOT OPERATED CONTROL DEVICE
[75] Inventor: Hassan Ghiassian, Seattle, Wash.
[73] Assignee: Hilltop Corporation, Seattle, Wash.
[21] Appl. No.: 113,842
[22] Filed: Aug. 30, 1993
[51] Int. Cl.⁵ .................... F16K 11/16; F16K 11/18
[52] U.S. Cl. ...................... 137/607; 74/512; 74/529; 251/295
[58] Field of Search .................. 137/607; 251/295; 74/512, 529, 560

[56] References Cited
U.S. PATENT DOCUMENTS

| | | | |
|---|---|---|---|
| 1,176,784 | 3/1916 | Speiden | 251/295 X |
| 1,214,322 | 1/1917 | Kirby | 251/295 |
| 1,366,120 | 1/1921 | Dederer | 137/607 X |
| 1,619,234 | 3/1927 | Beebe . | |
| 1,627,020 | 5/1927 | Dougherty | 251/295 X |
| 2,264,876 | 12/1941 | Hackley | 251/295 X |
| 2,287,011 | 6/1942 | Beebe | 74/512 |
| 3,158,178 | 11/1964 | Fiala et al. | 251/295 X |
| 3,466,096 | 9/1969 | Cunningham | 251/295 X |
| 3,924,660 | 12/1975 | Woodhams | 251/295 X |
| 4,026,164 | 5/1977 | Mozingo | 74/512 X |
| 5,125,623 | 6/1992 | Kiedinger | 251/295 |
| 5,138,899 | 8/1992 | Katagiri | 74/529 X |

*Primary Examiner*—Stephen M. Hepperle
*Attorney, Agent, or Firm*—Janet Sleath

[57] ABSTRACT

The present invention is a foot operated control device that provides variable control by means of a single foot pedal. The foot operated control device can be locked to allow continuous unattended operation. The foot pedal can be flipped into an upper position, for example into a cabinet. In a preferred embodiment of the invention, the foot operated control device comprises a foot operated faucet.

26 Claims, 7 Drawing Sheets

FOOT OPERATED CONTROL DEVICE

BACKGROUND OF THE INVENTION

This invention relates to control devices in general, and in particular to foot operated control devices.

Foot controlled faucets per se have been known in the art for some time. However, there has been a long-standing need for a practical foot controlled faucet that can provide variable foot control of both the volume of water flow and the mix of hot and cold water and can be locked to provide continuous unattended operation.

SUMMARY OF THE INVENTION

The present invention is a foot operated control device that provides variable control by means of a single foot pedal. It can be used to control flow, including fluid flow, such as pneumatic, hydraulic, steam and gas flow, and electrical flow. In addition, the foot operated control device can be used for differential actuation of mechanical means. It can control speed, direction, rotation and other movements. A specific embodiment of the present invention described herein is a foot operated faucet that provides variable foot control of both the volume of water flow and the mix of hot and cold water.

The foot operated control device of this invention comprises three foot actuated levers. The levers are spring loaded and are arranged in a row above the floor at foot level. A foot plate is mounted on the center lever. The foot plate pivots about the center lever and extends laterally from the center lever so that it overlaps the levers on either side of the center lever. Each of the laterally located levers actuates a fluid control device. In the foot operated faucet, one of the lateral levers actuates a valve that controls the flow of cold water; the other actuates the hot water valve. By stepping on the foot plate, the lateral levers are depressed and the flow of water is initiated. To vary the rate of water flow, the user varies the degree to which the plate is depressed. To vary the temperature of the water which is dispensed, the user pivots his foot on the foot plate so that the foot plate pivots about the center lever. This causes the foot plate to be depressed further on one side than the other, thereby actuating one of the lateral levers and its associated valve more than the other. By adjusting the direction and degree of the pivot, the user can control the mix of hot and cold water and thus the temperature of the water dispensed from the faucet.

The foot operated control device of this invention can be equipped with one or more locking mechanisms which permit continuous unattended operation of the invention. In the foot operated faucet, for example, this allows continuous unattended flow of hot or cold water. A locking mechanism may be mounted on each of the lateral levers or a single locking mechanism can be used to lock the foot plate in a depressed position, pivoted to either side. Although the embodiment of the foot operated control device described herein employs a specific locking mechanism, other locking mechanisms suitable for use in the present invention may be known to those skilled in the art.

The foot operated faucet described here is an improvement on the foot valves commonly used today mostly in medical facilities which allow the user to turn water on and off at a sink using his or her foot. Controlling water with the foot not only helps prevent the spread of communicable diseases but also saves water and is a kitchen and bathroom convenience. The foot valves now on the market are expensive, hard to use (especially getting different temperatures), hard to install, and hard to clean around. Because of these problems, they are currently used only where they are absolutely necessary.

The foot operated faucet has three features not found in foot valves on the market today. First, the foot operated faucet consists of a single foot pedal, instead of one for hot and one for cold, which controls both the temperature and the flow rate. The user can change temperature and flow rate very easily and get exactly the desired temperature and flow rate. Second, the foot controlled faucet can be locked into the "open" position to allow water of any temperature and any flow rate to run unattended which is essential for use in a kitchen or food processing plant. Third, the pedal can be flipped up to allow for easy cleaning, to keep the pedal out of sight, or to use the hand-controlled faucets as if the foot controlled faucet was not installed.

The foot operated faucet is designed to mix hot and cold water at the base of the spout. Because of this, water of the desired temperature is obtained quickly.

These improvements give the foot controlled faucet a much broader appeal. It can be used in places where sanitary conditions are desireable such as food processing plants, medical facilities, restaurants, schools, childcare facilities, and public restrooms. The foot controlled faucet can facilitate saving water in public restrooms, hotels, and in household kitchens and bathrooms. In a public bathroom, a foot operated faucet without a lock can be used so water cannot be left running. Because the distance between the top of the pedal and the floor is only 1 1/8 inches, it is easy to operate and does not require special balancing or pressure which would make it hard for elderly, handicapped, or children to use. In addition, it is a useful aid to people who have limited hand, arm, or grip strength. It can be used to remedy plumbing problems in ordinary households or in older homes with antique fixtures since old fixtures do not need to be replaced. Because the water pressure on hand-controlled faucets is transferred to the valves in the foot operated faucet, many leaks can be stopped simply by installing a foot operated faucet.

The foot operated faucet needs no special plumbing for installation. It is easier to install a foot operated faucet than it is to change the plumbing fixtures. It works with all existing faucets, antique as well as modern, single as well as double, or spout only (no faucets).

The foot operated faucet can be installed inside a cabinet or, for those sinks without a cabinet, it can be attached to the wall under the sink with legs extending far enough forward so that they can be easily reached while standing at the sink. The foot operated faucet can also be easily manufactured without a lock for places where a lock is not desireable.

The foot operated faucet has been designed so that the minimum number of different parts need to be manufactured. Wherever possible, parts of the same shape have been used repeatedly. Parts have been designed so they can be used for different embodiments. The foot operated faucet has also been designed so that it is easy to change parts or repair it. The present embodiment of the foot operated faucet uses a particular valve, but any appropriate valve can be substituted. The foot operated faucet is designed to be less expensive, and easier to use, install, and maintain. It is more attractive than foot valves currently on the market to homeowners, hospitals, schools, factories, food processing plants, and public facility managers.

DETAILED DESCRIPTION

In a preferred embodiment, the foot operated faucet is installed on the floor of a cabinet under a sink or tub with only the foot pedal showing below the cabinet door. Three notches are needed in the floor of the cabinet above the toe space to allow the foot operated faucet legs to operate without interfering with the cabinet door. The body of the foot operated faucet is covered by a box which is shown only in FIGS. 1 and 7. For clarity, connecting tubing is shown only in FIG. 1.

Figure 1:
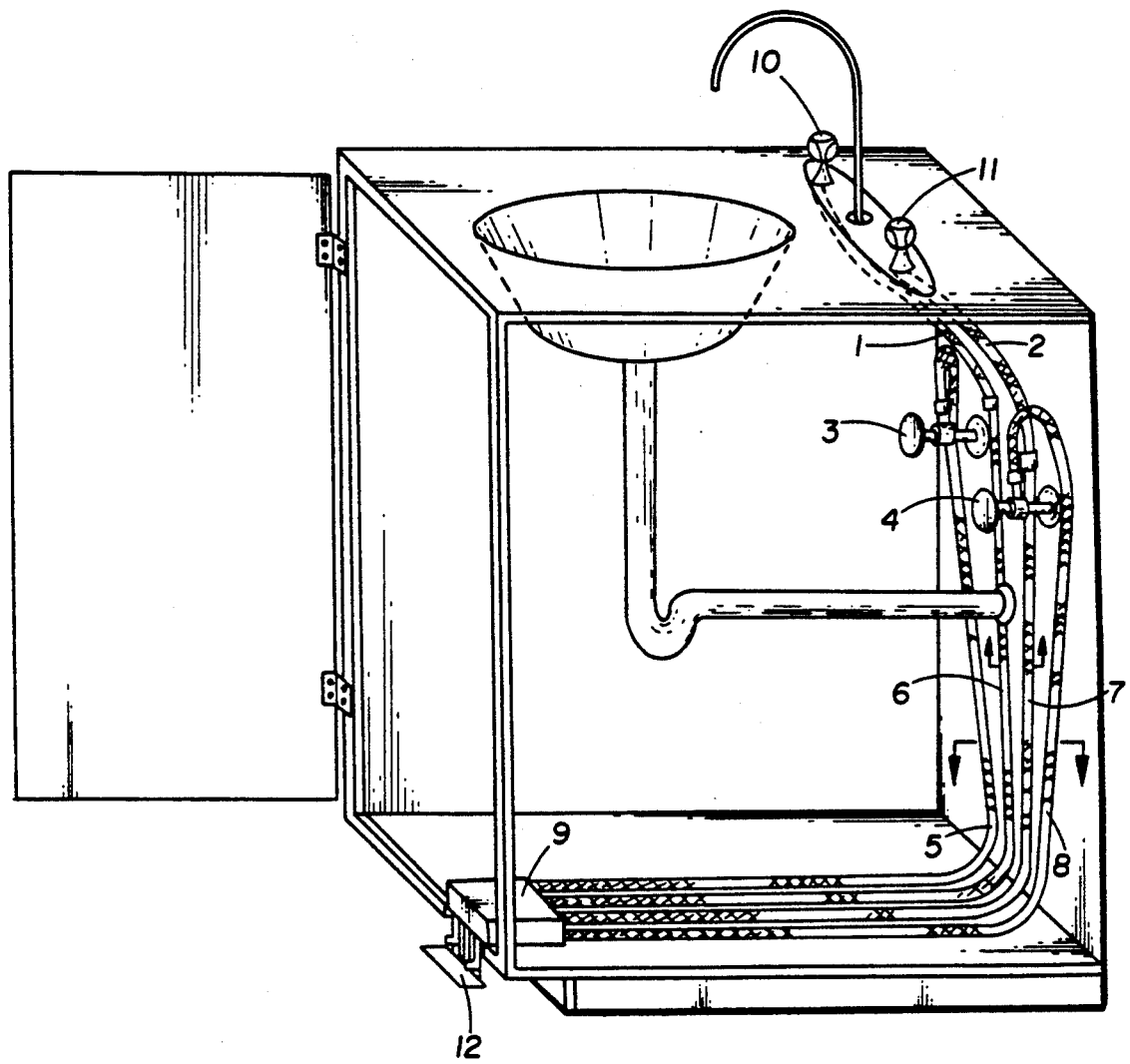
FIG. 1 is a cut-away view of cabinet with foot operated faucet installed.

As shown in FIG. 1, the foot operated faucet is installed by disconnecting the supply tubes 1 and 2 from the shut-off valves 3 and 4 and connecting tubing 5, 6, 7, and 8 at that point so that the water is routed from the shut-off valves down through the input tubes 5 and 8, through foot operated faucet box 9, up through the output tubes 6 and 7, and finally back up to the supply tubes 1 and 2. The foot operated faucet is installed easily to sinks that have single or double faucets 10 and 11. For sinks that have no faucets (spout only), supply tubes 1 and 2 need to be joined to the spout with a three-way fitting. Hot faucet 10 and cold faucet 11 need to be fully open to allow the foot operated faucet to function. After installation, pedal 12 takes the place of faucets 10 and 11.

Figure 2:
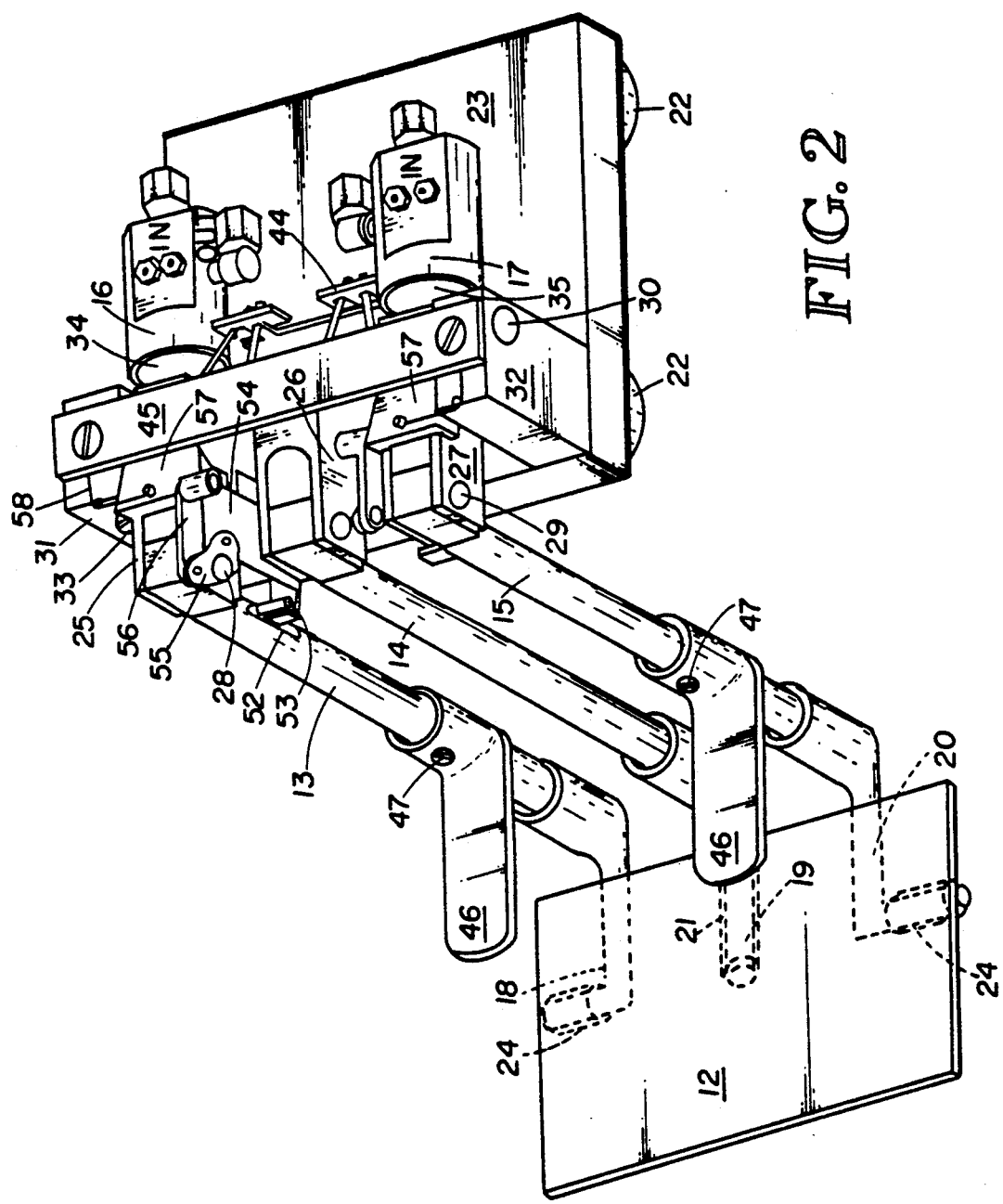
FIG. 2 is a perspective view.

As shown in FIG. 2, the foot operated faucet consists of a single pedal 12 which controls left leg 13, middle leg 14, and right leg 15. In turn, left leg 13 operates hot water valve 16 and right leg 15 operates cold water valve 17. Pedal 12 controls the temperature and flow rate of the water. Pedal 12 is hinged only to center leg rod 19 (not left leg rod 18 or right leg rod 20) by bushing 21 which surrounds rod 19 on the underside of pedal 12. Pressing on the left side of pedal 12 produces hot water, on the center produces equally mixed hot and cold water, and on the right side produces cold water. This process is explained in more detail in the description of FIG. 3.

As shown in FIG. 2, the height of the foot operated faucet can be adjusted by height adjusting legs 22 attached to the four corners of the underside of main plate 23. The distance between the floor and the top of the center of pedal 12 should be 1 1/8 inches. The ends of leg rods 18 and 20 are surrounded by bushing 24 which rolls freely when pedal 12 is pushed down. Leg rods 18, 19, and 20 are soldered onto legs 13, 14, and 15. Right leg 15 is hinged to right arm 27 at pivot point 29. In the same way, middle leg hinged to middle arm 26; and left leg 13 is hinged to left arm 25. The shape of the arms is shown more clearly in FIG. 4. Arms 25, 26, and 27 are held in place with and pivot around main rod 30 which runs between left seating 31 and right seating 32. The main rod is shown more clearly in FIG. 4. Seatings 31 and 32 are bolted to plate 23. Main rod 30 is kept stationary by set screw 33.

As shown in FIG. 2, valves 16 and 17 are bolted to main plate 23. Valves 16 and 17 are normally closed valves; pressure on hot valve push button 34 and cold valve push button 35 opens valves 16 and 17. The degree to which valves 16 and 17 are opened depends on the amount of pressure applied to pedal 12. This is how the flow rate is controlled. The maximum vertical movement of pedal 12 is 1 1/8 inches.

Figure 3:
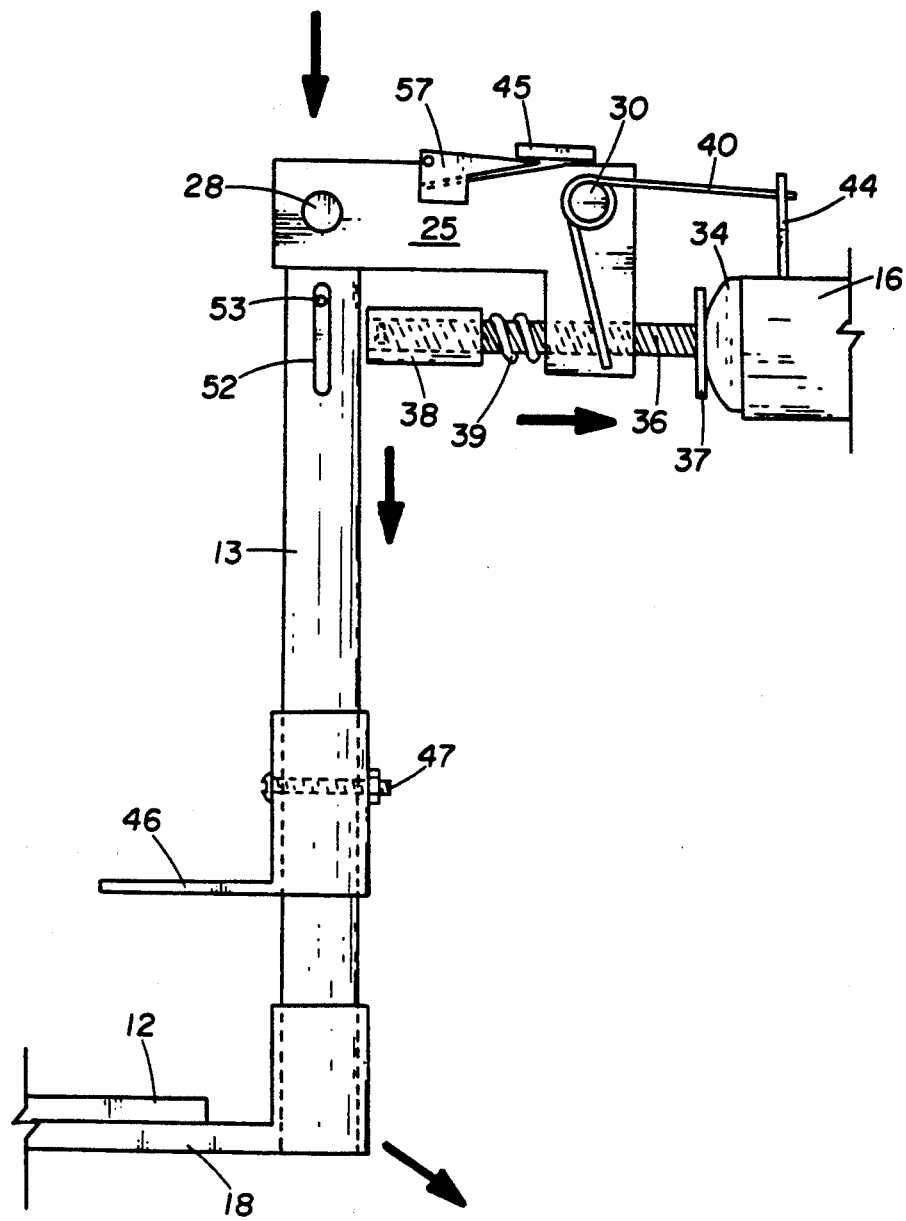
FIG. 3 is a side view of one leg.

As shown in FIG. 3, pushing down on pedal 12 directly over left leg rod 18 produces hot water because pedal 12 presses down on left leg rod 18 which pulls left leg 13 down and away from the user as the arrows show. Leg 13 pulls down on arm 25 which pivots around main rod 30. The movement of left arm 25 will cause round plate 37 at the end of screw 36 to push hot valve push button 34 which will open hot water valve 16.

Screw 36, which is screwed through a threaded hole in arm 25, serves two purposes. First, plate 37 at the end of the screw 36 can be moved by adjusting screw 36, thereby controlling the distance between plate 37 and valve push button 34. (This option is provided so that the position of the valves or other controlling devices can be adjusted.) Second, long nut 38, when screwed to the correct point, acts to keep leg 13 at a right angle to arm 25; it will not let leg 13 form a smaller angle to arm 25. However, the user can adjust the angle between leg 13 and arm 25. Spring 39 around screw 36 keeps long nut 38 and screw 36 from moving out of position. Screw 36 is found in all three arms but it is used to control a valve push button only in arms 25 and 27.

Pressure on the right side of pedal 12 opens cold water valve 17 in the same way as the hot water valve is operated. Any pressure on pedal 12 between the extreme right or left will mix the water to a temperature between hot and cold. This is how the temperature is controlled.

Figure 4:
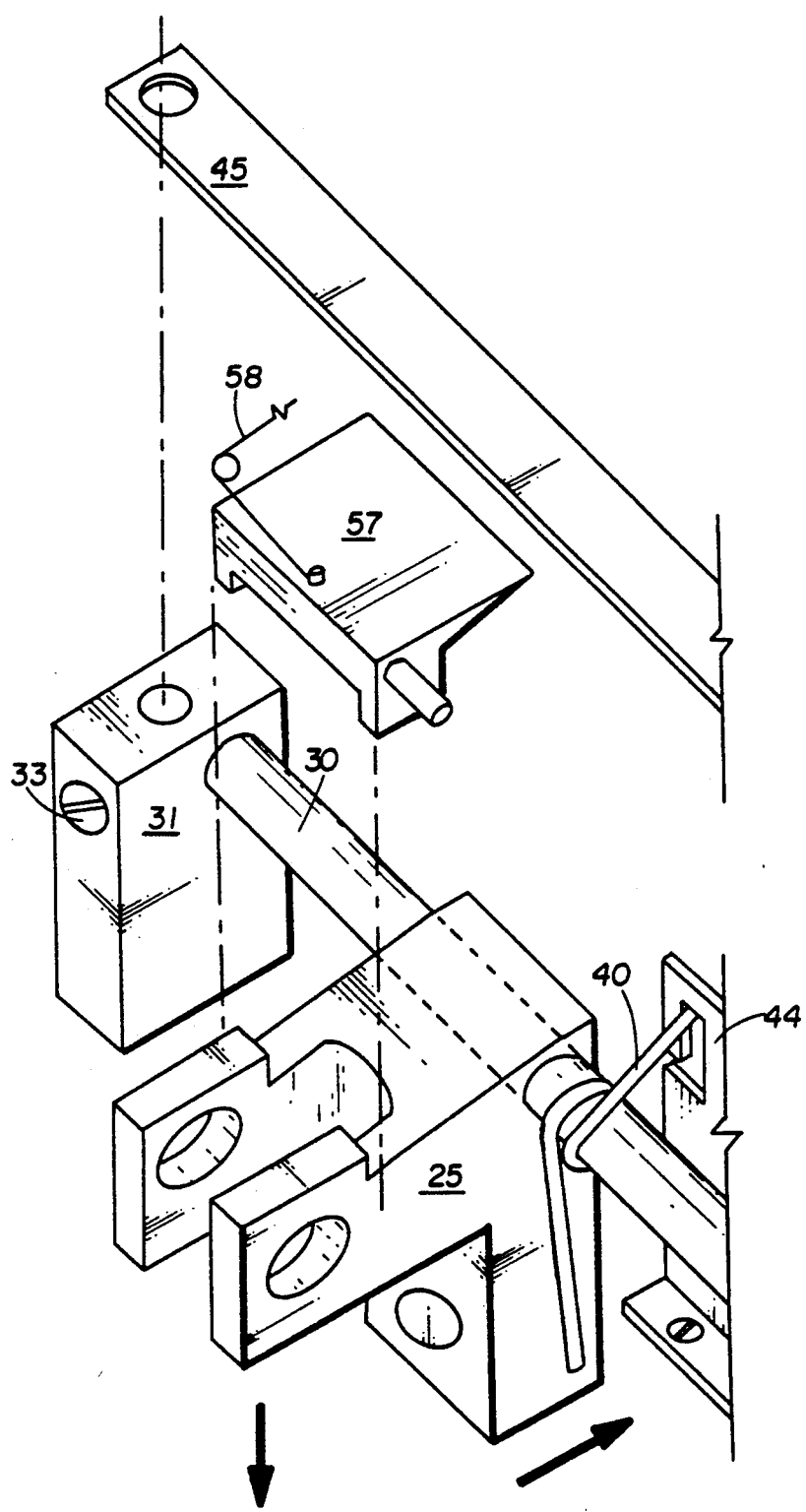
FIG. 4 is a perspective view of main rod, arm, locking piece, and top bar.

FIG. 4 shows main rod 30, arm 25, locking piece 57, and top bar 45 in more detail. Pressure on the pedal pulls down arm 25 which pivots around main rod 30. When pressure on the pedal is released, torsion spring 40 returns arm 25 to its normal position. One end of torsion spring 40 sticks into arm 25 and the other end is caught in spring seating 44. Top bar 45 prevents arm 25 from being pushed too far by torsion spring 40.

FIG. 4 also shows how locking piece 57 works. When arm 25 is pulled down and pivots around main rod 30, a wedge-shaped gap is created between arm 25 and top bar 45. If the locking mechanism is used, it pushes locking piece 57 into this gap and does not allow arm 25 to return to its normal position until the locking mechanism is "unlocked." Locking piece 57 is shaped like a wedge with edges extending downward to keep it in place on top of arm 25. Because of the edges on locking piece 57, there is some space between arm 25 and seating 31 for these edges. In order to prevent slipping, the surfaces of locking piece 57 and top bar 45 are rough wherever they make contact. The locking mechanism is explained in more detail in the description of FIG. 6.

Figure 5:
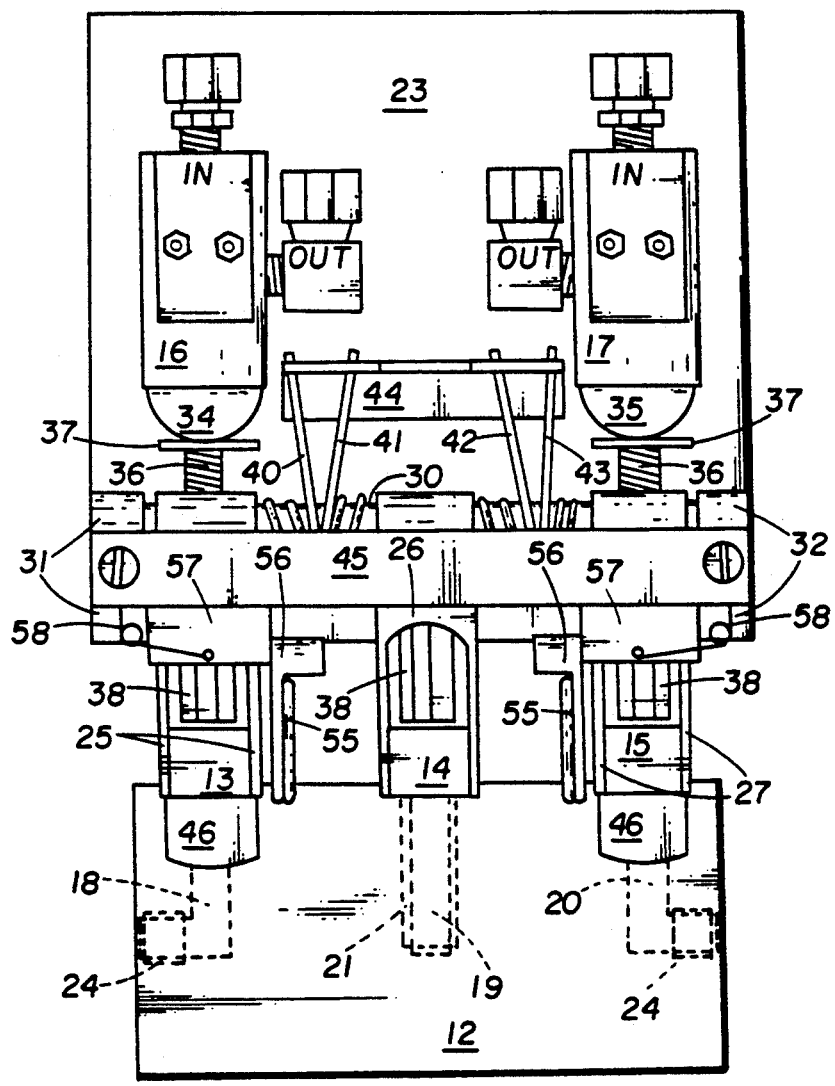
FIG. 5 is a top view.

As shown in FIG. 5, top bar 45 is screwed to left seating 31 and right seating 32 over arms 25, 26, and 27. The main function of top bar 45 is to keep the force of torsion springs 40, 41, 42, and 43 from pushing arms 25, 26, and 27 out of their correct positions. One arm of torsion spring 40 sticks into left arm 25 below main rod 30 and the other end hooks into spring seating 44. Likewise torsion spring 43 works on right arm 27. Torsion springs 41 and 42 work on either side of arm 26. Spring seating 44 is bolted to plate 23.

The foot operated faucet can be locked into the "open" position which allows water to flow without pressure on pedal 12. This feature can also be used when legs 13, 14, and 15 and pedal 12 are flipped up into the cabinet enabling hand-controlled faucets 10 and 11 to be used as if the foot operated faucet was not installed. The legs can be flipped up while the foot operated faucet is locked at any volume or temperature or when the foot operated faucet is unlocked.

Figure 6:
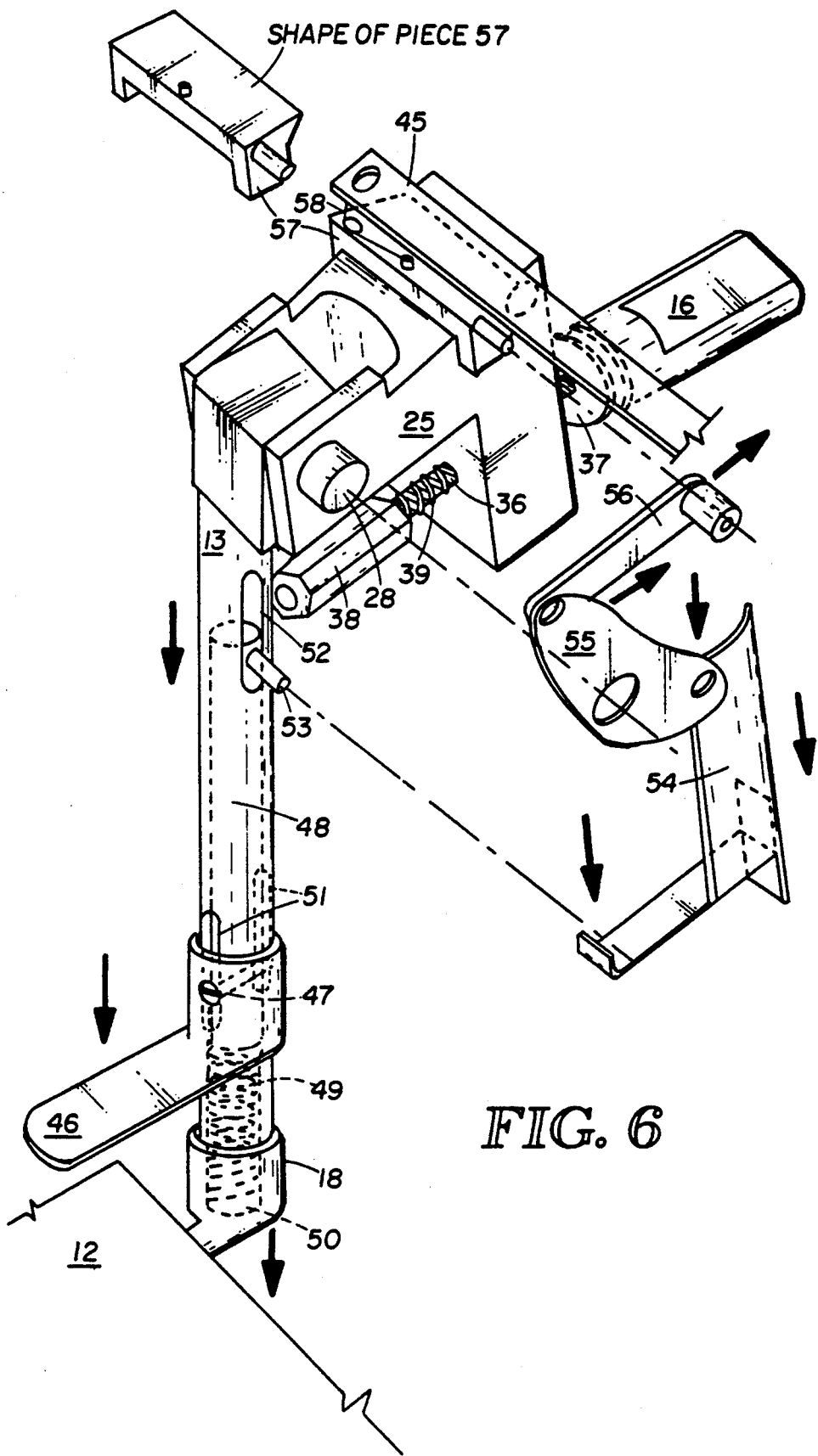
FIG. 6 is a perspective view of one leg in the locked position.

FIG. 6 shows left leg 13 in the locked position. In the same way that pressure on pedal 12 opens valve 16, pressure on lock pedal 46 opens valve 16. Pressure on lock pedal 46 pulls arm 25 toward the floor. However, pressure on lock pedal 46 also sets the lock which works as follows. Screw 47 attaches lock pedal 46 to interior rod 48 inside leg 13. Lock pedal 46 and interior rod 48 always move in unison. Lock pedal 46 slides up and down on the outside of leg 13. The hole through interior rod 48 for screw 47 is threaded which allows interior rod 48 to be centered inside leg 13. Spring 49 presses upward on interior rod 48. The pieces inside leg 13 are held in by leg screw 50 which closes off the bottom of leg 13.

Slots 51 in leg 13 allow screw 47, lock pedal 46, and interior rod 48 to move up and down. Slot 52 in leg 13 allows leg pin 53 to move up and down with the movement of interior rod 48. When not in use, leg pin 53 always rests just above the "toe" end of boot-shaped piece 54. When leg pin 53 moves down, it pulls boot-shaped piece 54 down. Piece 54 and cam 55 are hinged at one point so when piece 54 moves down, it rocks cam 55. Cam 55 pivots around pivot point 28 and is hinged at one point to rod 56. When cam 55 rocks, it pushes rod 56 in the direction of the arrows. Rod 56, which fits around the pin extending from locking piece 57, pushes locking piece 57 further under top bar 45. The farther arm 25 is pulled downward, the more valve 16 is opened, the more gap there is between arm 25 and top bar 45, and the more locking piece 57 will be pushed under top bar 45. Because there is always pressure on arm 25 from torsion spring 40 (see FIG. 4) pushing arm 25 toward top bar 45, locking piece 57 becomes trapped between top bar 45 and arm 25. Locking piece 57 keeps arm 25 from moving when pressure on lock pedal 46 is released. Once the lock is set, it can be reset by pushing lock pedal 46 down further.

To unlock it, the user applies light pressure to pedal 12 so that more gap is created between arm 25 and top bar 45. Then, because there is no pressure from lock pedal 46 through the locking pieces to locking piece 57, spring 58 is free to pull locking piece 57 out from under top bar 45 and toward the front of arm 25 where it rests when it is not in use.

Locking pieces 54, 55, 56, and 57 are shaped for the best possible movement and to keep themselves in the right positions.

In the same way that left leg 13 can be locked, right leg 15 can also be locked. Each of these locks is independently operated.

Figure 7:
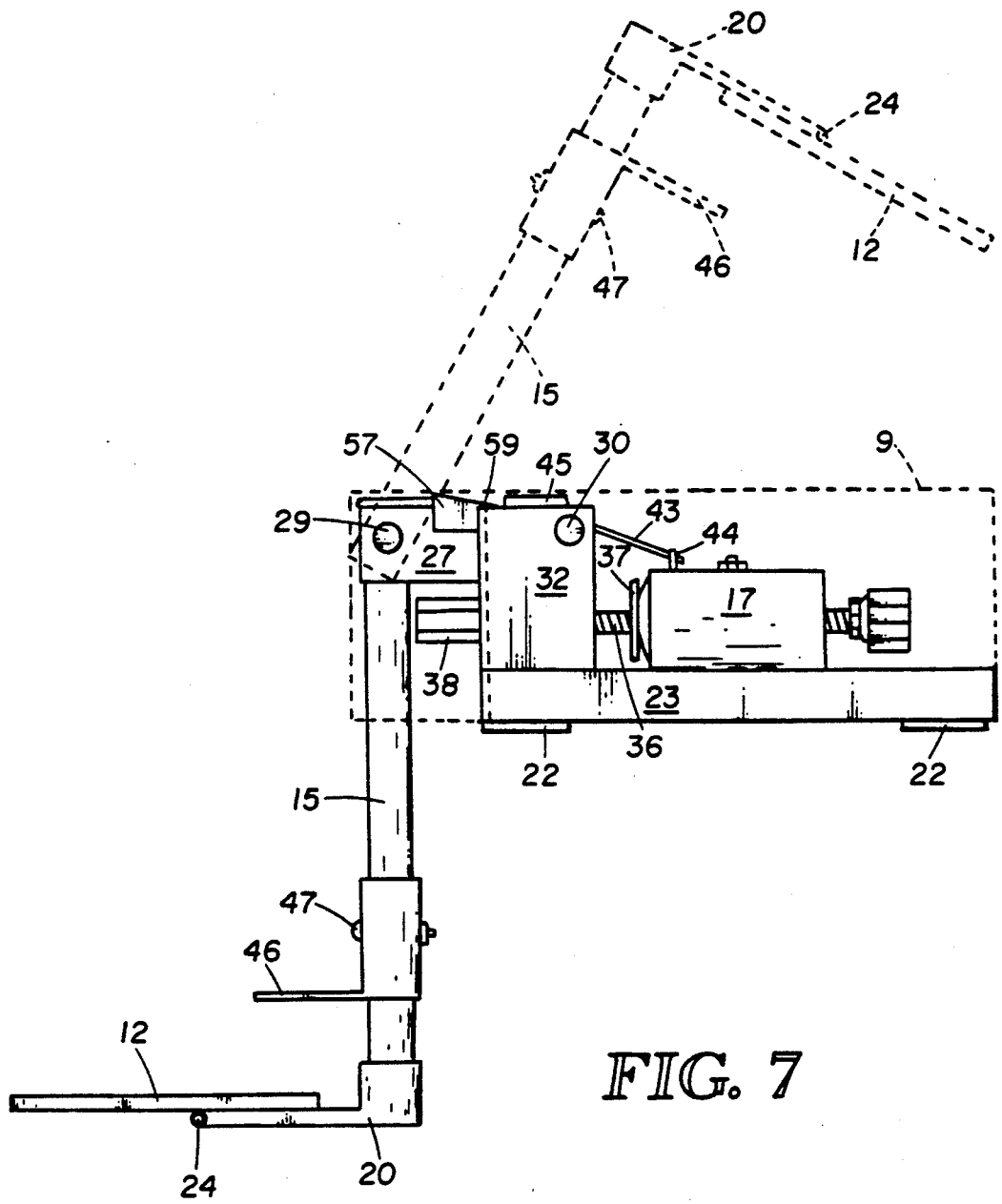
FIG. 7 is a side view with legs flipped up.

FIG. 7 shows box 9 with dotted lines; box 9 covers most of the working parts. FIG. 7 also shows with dotted lines the legs and pedal when they are in the flipped up position. To flip the legs up, leg 15 pivots around pivot point 29; legs 13 and 14 pivot around similar points. This can be done for several reasons: first, so that it will not be visible when the cabinet is closed; second, so that it can be cleaned around easily; and third, so that hand-controlled faucets 10 and 11 can be used as if the foot operated faucet was not installed. Box 9 is hinged at point 59 to allow legs 13, 14, and 15 to be flipped up.

Although the present invention has been described in terms of specific embodiments, changes and modifications can be carried out without departing from the scope of the invention which is intended to be limited only by the scope of the appended claims.

What is claimed is:

1. A foot operated control device comprising:
   a spring loaded center lever situated above the floor at foot level;
   a first and a second spring loaded lateral lever situated parallel to and located in a horizontal plane with said center lever, said first lateral lever being positioned on one side of said center lever and said second lateral lever being located on the opposite side of said center lever;
   a foot pedal mounted upon and pivoting about said center lever, said foot pedal extending laterally from said center lever and overlapping said first and second lateral levers;
   a first and a second flow control means actuated by said first and second lateral levers;
   whereby the application of pressure on said foot pedal depresses said center lever and said first and second lateral levers differentially actuating said first and second flow control means.

2. A foot operated control device as recited in claim 1, wherein said first and second flow control means are fluid flow control means.

3. A foot operated control device as recited in claim 2, wherein said center lever and said first and second lateral levers are hinged whereby said center lever, said first and second lateral levers and said foot pedal can be moved into an upper position.

4. A foot operated control device as recited in claim 2, further comprising a locking means whereby one or more of said first and second fluid flow control means can be continuously operated without the application of pressure to said foot pedal.

5. A foot operated control device as recited in claim 4, wherein said locking means comprises:
   a first and a second wedge-shaped locking piece mounted immediately above a first and a second horizontal arm, said first and second horizontal arms being movably attached to the upper end of said first and second lateral levers;
   a horizontal bar rigidly mounted above and extending laterally across said first and second horizontal arms, whereby depressing said first and second lateral levers creates a first and a second wedge-shaped gap between said horizontal bar and said first and second horizontal arms;
   a first and a second locking pedal mounted on said first and second lateral levers and connected to said first and second wedge-shaped locking pieces, whereby depressing said first and second locking pedals moves said first and second locking pieces into said first and second wedge-shaped gaps locking said first and second lateral levers in a depressed position.

6. A foot operated control device as recited in claim 4, wherein said locking means comprises:
- a wedge-shaped locking piece mounted immediately above a horizontal arm, said horizontal arm being movably attached to the upper end of said center lever;
- a horizontal bar rigidly mounted above and extending laterally across said horizontal arm, whereby depressing said center lever creates a wedge-shaped gap between said horizontal bar and said horizontal arm;
- a locking pedal mounted on said center lever and connected to said wedge-shaped locking piece, whereby depressing said locking pedal moves said locking piece into said wedge-shaped gap locking said center lever in a depressed position.

7. A foot operated control device as recited in claim 2, wherein;
- said foot operated control device comprises a foot controlled faucet;
- said first fluid control means is a cold water valve; and
- said second fluid control means is a hot water valve.

8. A foot operated control device as recited in claim 7, wherein said center lever and said first and second lateral levers are hinged whereby said center lever, said first and second lateral levers and said foot pedal can be moved into an upper position.

9. A foot operated control device as recited in claim 7, further comprising a locking means whereby one or more of said valves can be continuously operated without the application of pressure to said foot pedal.

10. A foot operated control device as recited in claim 9, wherein said locking means comprises:
- a first and a second wedge-shaped locking piece mounted immediately above a first and a second horizontal arm, said first and second horizontal arms being movably attached to the upper end of said first and second lateral levers;
- a horizontal bar rigidly mounted above and extending laterally across said first and second horizontal arms, whereby depressing said first and second lateral levers creates a first and a second wedge-shaped gap between said horizontal bar and said first and second horizontal arms;
- a first and a second locking pedal mounted on said first and second lateral levers and connected to said first and second wedge-shaped locking pieces, whereby depressing said first and second locking pedals moves said first and second locking pieces into said first and second wedge-shaped gaps locking said first and second lateral levers in a depressed position.

11. A foot operated control device as recited in claim 9, wherein said locking means comprises:
- a wedge-shaped locking piece mounted immediately above a horizontal arm, said horizontal arm being movably attached to the upper end of said center lever;
- a horizontal bar rigidly mounted above and extending laterally across said horizontal arm, whereby depressing said center lever creates a wedge-shaped gap between said horizontal bar and said horizontal arm;
- a locking pedal mounted on said center lever and connected to said wedge-shaped locking piece, whereby depressing said locking pedal moves said locking piece into said wedge-shaped gap locking said center lever in a depressed position.

12. A foot operated control device as recited in claim 1, wherein said first and second flow control means are electrical flow control means.

13. A foot operated control device as recited in claim 12, wherein said center lever and said first and second lateral levers are hinged whereby said center lever, said first and second lateral levers and said foot pedal can be moved into an upper position.

14. A foot operated control device as recited in claim 12, further comprising a locking means whereby one or more of said first and second electrical flow control means can be continuously operated without the application of pressure to said foot pedal.

15. A foot operated control device as recited in claim 14, wherein said locking means comprises:
- a first and a second wedge-shaped locking piece mounted immediately above a first and a second horizontal arm, said first and second horizontal arms being movably attached to the upper end of said first and second lateral levers;
- a horizontal bar rigidly mounted above and extending laterally across said first and second horizontal arms, whereby depressing said first and second lateral levers creates a first and a second wedge-shaped gap between said horizontal bar and said first and second horizontal arms;
- a first and a second locking pedal mounted on said first and second lateral levers and connected to said first and second wedge-shaped locking pieces, whereby depressing said first and second locking pedals moves said first and second locking pieces into said first and second wedge-shaped gaps locking said first and second lateral levers in a depressed position.

16. A foot operated control device as recited in claim 14, wherein said locking means comprises:
- a wedge-shaped locking piece mounted immediately above a horizontal arm, said horizontal arm being movably attached to the upper end of said center lever;
- a horizontal bar rigidly mounted above and extending laterally across said horizontal arm, whereby depressing said center lever creates a wedge-shaped gap between said horizontal bar and said horizontal arm;
- a locking pedal mounted on said center lever and connected to said wedge-shaped locking piece, whereby depressing said locking pedal moves said locking piece into said wedge-shaped gap locking said center lever in a depressed position.

17. A foot operated control device comprising:
- a spring loaded center lever situated above the floor at foot level;
- a first and a second spring loaded lateral lever situated parallel to and located in a horizontal plane with said center lever, said first lateral lever being positioned on one side of said center lever and said second lateral lever being located on the opposite side of said center lever;
- a foot pedal mounted upon and pivoting about said center lever, said foot pedal extending laterally from said center lever and overlapping said first and second lateral levers;
- a first and a second mechanical control means actuated by said first and second lateral levers;

whereby the application of pressure on said foot pedal depresses said center lever and said first and second lateral levers differentially actuating said first and second mechanical control means.

18. A foot operated control device as recited in claim 17, wherein said center lever and said first and second lateral levers are hinged whereby said center lever, said first and second lateral levers and said foot pedal can be moved into an upper position.

19. A foot operated control device as recited in claim 17, further comprising a locking means whereby one or more of said first and second mechanical control means can be continuously operated without the application of pressure to said foot pedal.

20. A foot operated control device as recited in claim 19, wherein said locking means comprises:
 a first and a second wedge-shaped locking piece mounted immediately above a first and a second horizontal arm, said first and second horizontal arms being movably attached to the upper end of said first and second lateral levers;
 a horizontal bar rigidly mounted above and extending laterally across said first and second horizontal arms, whereby depressing said first and second lateral levers creates a first and a second wedge-shaped gap between said horizontal bar and said first and second horizontal arms;
 a first and a second locking pedal mounted on said first and second lateral levers and connected to said first and second wedge-shaped locking pieces, whereby depressing said first and second locking pedals moves said first and second locking pieces into said first and second wedge-shaped gaps locking said first and second lateral levers in a depressed position.

21. A foot operated control device as recited in claim 19, wherein said locking means comprises:
 a wedge-shaped locking piece mounted immediately above a horizontal arm, said horizontal arm being movably attached to the upper end of said center lever;
 a horizontal bar rigidly mounted above and extending laterally across said horizontal arm, whereby depressing said center lever creates a wedge-shaped gap between said horizontal bar and said horizontal arm;
 a locking pedal mounted on said center lever and connected to said wedge-shaped locking piece, whereby depressing said locking pedal moves said locking piece into said wedge-shaped gap locking said center lever in a depressed position.

22. A foot operated control device comprising:
 a spring loaded center lever situated above the floor at foot level;
 a first and a second spring loaded lateral lever situated parallel to and located in a horizontal plane with said center lever, said first lateral lever being positioned on one side of said center lever and said second lateral lever being located on the opposite side of said center lever;
 a foot pedal mounted upon and pivoting about said center lever, said foot pedal extending laterally from said center lever and overlapping said first and second lateral levers;
 a first and a second variable actuation means actuated by said first and second lateral levers;
 whereby the application of pressure on said foot pedal depresses said center and said first and second lateral levers differentially actuating said first and second variable actuation means.

23. A foot operated control device as recited in claim 22, wherein said center lever and said first and second lateral levers are hinged whereby said center lever, said first and second lateral levers and said foot pedal can be moved into an upper position.

24. A foot operated control device as recited in claim 22, further comprising a locking means whereby one or more of said first and second variable actuation means can be continuously operated without the application of pressure to said foot pedal.

25. A foot operated control device as recited in claim 24, wherein said locking means comprises:
 a first and a second wedge-shaped locking piece mounted immediately above a first and a second horizontal arm, said first and second horizontal arms being movably attached to the upper end of said first and second lateral levers;
 a horizontal bar rigidly mounted above and extending laterally across said first and second horizontal arms, whereby depressing said first and second lateral levers creates a first and a second wedge-shaped gap between said horizontal bar and said first and second horizontal arms;
 a first and a second locking pedal mounted on said first and second lateral levers and connected to said first and second wedge-shaped locking pieces, whereby depressing said first and second locking pedals moves said first and second locking pieces into said first and second wedge-shaped gaps locking said first and second lateral levers in a depressed position.

26. A foot operated control device as recited in claim 24, wherein said locking means comprises:
 a wedge-shaped locking piece mounted immediately above a horizontal arm, said horizontal arm being movably attached to the upper end of said center lever;
 a horizontal bar rigidly mounted above and extending laterally across said horizontal arm, whereby depressing said center lever creates a wedge-shaped gap between said horizontal bar and said horizontal arm;
 a locking pedal mounted on said center lever and connected to said wedge-shaped locking piece, whereby depressing said locking pedal moves said locking piece into said wedge-shaped gap locking said center lever in a depressed position.

* * * * *

UNITED STATES PATENT AND TRADEMARK OFFICE
CERTIFICATE OF CORRECTION

PATENT NO.  : 5,322,084
DATED       : June 21, 1994
INVENTOR(S) : Hassan Ghiassian It is certified that error appears in the above-identified patent and that said Letters Patent is hereby corrected as shown below:

Col. 3, line 64, before "hinged", insert --14 is--.

Signed and Sealed this

Fourth Day of October, 1994

Attest:

BRUCE LEHMAN

Attesting Officer

Commissioner of Patents and Trademarks